(12) United States Patent
Philbrick et al.

(10) Patent No.: US 9,024,610 B2
(45) Date of Patent: May 5, 2015

(54) SYSTEM AND METHOD OF BALANCED SLOPE COMPENSATION FOR SWITCH MODE REGULATORS

(75) Inventors: Rhys S. A. Philbrick, Cary, NC (US); Steven P. Laur, Raleigh, NC (US); M. Jason Houston, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 292 days.

(21) Appl. No.: 13/536,831

(22) Filed: Jun. 28, 2012

(65) Prior Publication Data

US 2013/0293212 A1 Nov. 7, 2013

Related U.S. Application Data

(60) Provisional application No. 61/640,816, filed on May 1, 2012.

(51) Int. Cl.
*G05F 1/00* (2006.01)
*H02M 3/157* (2006.01)

(52) U.S. Cl.
CPC .................................. *H02M 3/157* (2013.01)

(58) Field of Classification Search
CPC ........... H02M 3/156–3/158; H02M 2001/0025
USPC .................................................. 323/271–299
See application file for complete search history.

(56) References Cited

U.S. PATENT DOCUMENTS

| | | | | |
|---|---|---|---|---|
| 6,366,070 B1 * | 4/2002 | Cooke et al. | ................. | 323/284 |
| 7,671,575 B1 * | 3/2010 | Suzuki et al. | ................. | 323/285 |
| 8,138,734 B2 * | 3/2012 | Xi et al. | ........................ | 323/284 |
| 8,421,432 B2 * | 4/2013 | Hawkes | ........................ | 323/288 |
| 2004/0095105 A1 * | 5/2004 | Nakata | ........................ | 323/280 |
| 2005/0162142 A1 * | 7/2005 | Kernahan et al. | ............. | 323/283 |
| 2006/0049815 A1 * | 3/2006 | Ho et al. | ........................ | 323/282 |
| 2008/0024100 A1 * | 1/2008 | Huang et al. | ................. | 323/282 |
| 2011/0062932 A1 | 3/2011 | Hawkes | | |
| 2011/0101932 A1 * | 5/2011 | Nakazono | .................... | 323/271 |
| 2011/0169468 A1 * | 7/2011 | Wu et al. | ........................ | 323/282 |
| 2012/0119718 A1 * | 5/2012 | Song | ............................. | 323/282 |
| 2012/0161728 A1 * | 6/2012 | Chen et al. | .................... | 323/271 |
| 2013/0207629 A1 * | 8/2013 | Engelhardt | .................... | 323/282 |
| 2013/0207632 A1 * | 8/2013 | Thandi et al. | ................. | 323/288 |

FOREIGN PATENT DOCUMENTS

CN 101093958 A 6/2010

* cited by examiner

*Primary Examiner* — Timothy J Dole
*Assistant Examiner* — Shahzeb K Ahmad
(74) *Attorney, Agent, or Firm* — Gary Stanford

(57) ABSTRACT

A modulator with balanced slope compensation including a control network, a slope compensation network, an offset network and an adjust network. The control network receives a feedback signal indicative of an output voltage and provides a loop control signal. The slope compensation network develops a slope compensation signal. The offset network determines a DC offset of the slope compensation signal. The adjust network combines the DC offset, the slope compensation signal and the loop control signal to provide a balanced slope compensated control signal. The DC offset may be determined as a peak of the slope compensation signal. The slope compensation signal may be developed based on the output voltage and a pulse control signal, in which the pulse control signal is developed using the balanced slope compensated control signal.

21 Claims, 3 Drawing Sheets

$(OFF_{ADJ}$ AND $V_{SCOMP} = 0)$ $(OFF_{ADJ} = 0)$

US 9,024,610 B2

SYSTEM AND METHOD OF BALANCED SLOPE COMPENSATION FOR SWITCH MODE REGULATORS

CROSS-REFERENCE TO RELATED APPLICATIONS

This application claims the benefit of U.S. Provisional Application Ser. No. 61/640,816, filed on May 1, 2012, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

The benefits, features, and advantages of the present invention will become better understood with regard to the following description and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Slope compensation may be used in some regulator configurations to provide stability. Peak current mode regulators, for example, are inherently unstable at higher duty cycles, such as greater than 50%. The ratio of the input voltage to the output voltage is decreasing in buck regulators resulting in an increase in steady state duty cycle. Slope compensation is added to maintain stability at higher duty cycles, especially during load changes.

Constant modulator gain over the duty cycle simplifies tuning of the regulator. The slope compensation should be about equal to the slope of the negative inductor current, and for good feed forward operation, the compensation DC voltage should be independent of changes of the duty cycle. Theoretically, the compensation signal at the output of the loop error amplifier should respond only to load changes. Otherwise, the compensation signal is designed to operate at a predetermined DC level assuming continuous conduction mode (CCM) operation. In practical configurations, slope compensation added for stability adds DC offset which modifies the compensation signal. The additional DC offset shifts the DC bias point away from the desired DC bias point for which the circuit was designed resulting in an unbalanced configuration. Higher gain is typically used to compensate the additional DC offset which complicates circuit design, adds cost, and can impede natural input voltage feed-forward.

Figure 1:
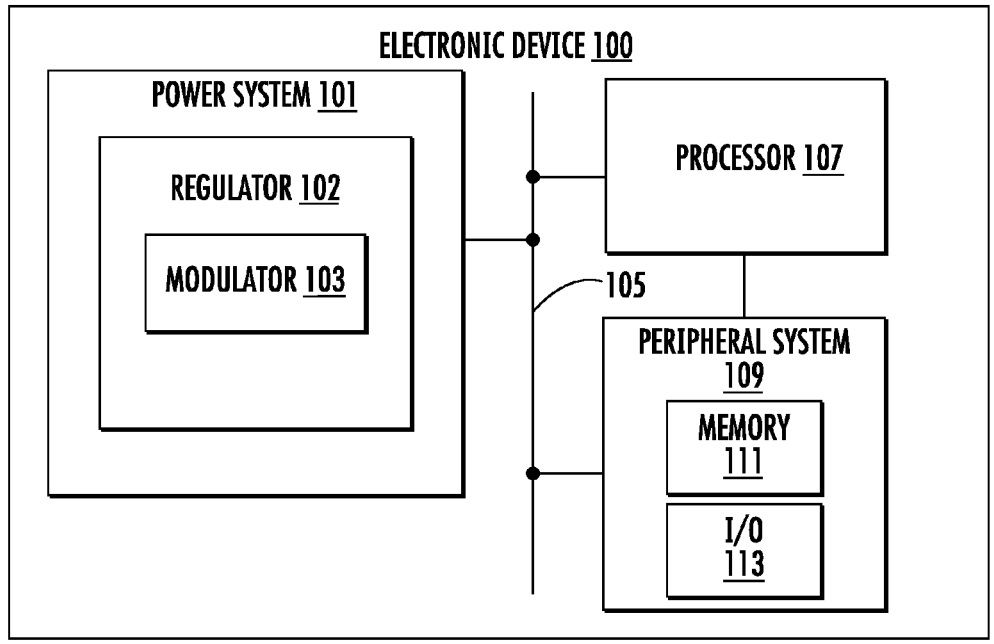
FIG. 1 is a simplified block diagram of an electronic device configured with a power system having a regulator with a modulator implemented with balanced slope compensation according to an embodiment of the present invention.

FIG. 1 is a simplified block diagram of an electronic device 100 configured with a power system 101 having a regulator 102 with a modulator 103 implemented with balanced slope compensation according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a bus 105, which includes any combination of power and/or signal conductors. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The power system 101 may be configured to include a battery (rechargeable or non-rechargeable) and/or may be configured to operate with an alternating current (AC) adapter or the like.

Figure 2:
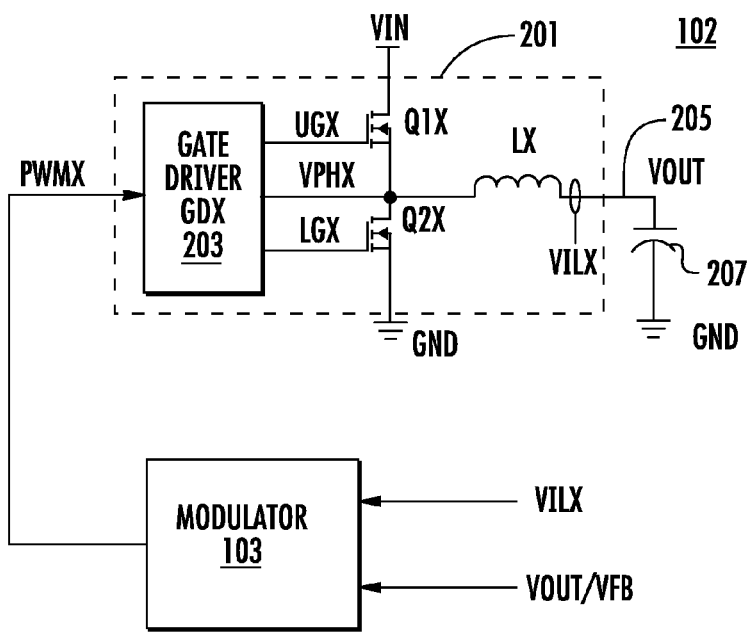
FIG. 2 is a simplified schematic and block diagram of an exemplary regulator including the modulator of FIG. 1.

FIG. 2 is a simplified schematic and block diagram of an exemplary regulator 102 including the modulator 103. The regulator 102 includes a phase circuit 201 which may be implemented for a single phase system or a multiphase system. The phase circuit 201 includes a gate driver 203 labeled GDX receiving a pulse width modulation (PWM) signal PWMX and providing a corresponding upper gate signal UGX to an upper electronic switch Q1X and a corresponding lower gate signal LGX to a lower electronic switch Q2X. The electronic switches Q1X and Q2X have their current terminals (e.g., drains and sources) coupled series between an input voltage VIN and a common reference voltage GND (e.g., ground or any other suitable positive or negative reference voltage level). It is noted that GND generally represents one or more reference nodes, including one or more ground levels or nodes, such as signal ground, power ground, chassis ground, etc., or any other suitable reference voltage level. The switches Q1X and Q2X are coupled together at an intermediate phase node VPHX developing a corresponding phase voltage, and a corresponding output inductor LX has one end coupled to a corresponding phase node and its other end coupled to an output node 205 developing an output voltage VOUT. An output capacitor 207 is coupled between output node 205 and GND. VOUT may be provided via bus 105 to one or more loads, such as the processor 107 and one or more devices of the peripheral system 109. In an alternative embodiment, the low side switch Q2X may be replaced by a diode according to a non-synchronous buck regulator topology.

The current through the inductor LX is sensed or otherwise simulated or synthesized to provide a signal VILX indicative thereof. A modulator receives VILX and VOUT and/or a feedback signal VFB and generates PWMX provided to the phase circuit 201. VFB may be a sensed or proportional signal indicative of VOUT, such as developed by a voltage divider or the like (not shown). In operation, the modulator 103 receives VILX and VOUT (and/or VFB) and possibly other sensed signals or parameters and generates the PWMX signal for purposes of regulation. The gate driver 203 generates UGX and LGX based on PWMX to turn on and off the electronic switches Q1X and Q2X to regulate the voltage level of VOUT.

The regulator 102 may be implemented as a single phase system with a single phase circuit 201 or may be implemented as a multiphase system with multiple phase circuits 201. For the multiphase case, the "X" appended to a component or signal name generally denotes an index value indicative of repetitive instances of the component or signal name for multiphase systems (e.g., GD1, GD2, ...). The "X" notation may be dropped (or otherwise ignored or assumed to be "1") for a single phase system. For example, in the case of multiphase, the modulator 103 develops multiple PWM signals (PWM1, PWM2, ...) each provided to a corresponding one of multiple gate drivers (GD1, GD2, ...) for developing corresponding sets of multiple upper gate signals (UG1, UG2, ...) and lower gate signals (LG1, LG2, ...) for controlling multiple electronic switch pairs (Q11/Q21, Q12/Q22, ...) coupled to corresponding phase nodes (VPH1, VPH2, ...) and corresponding output inductors (L1, L2, ...). The current through each output inductor LX is indicated by a corresponding current signal (VIL1, VIL2, ...). The phases circuits have their outputs coupled together to develop a single output VOUT.

Figure 3:
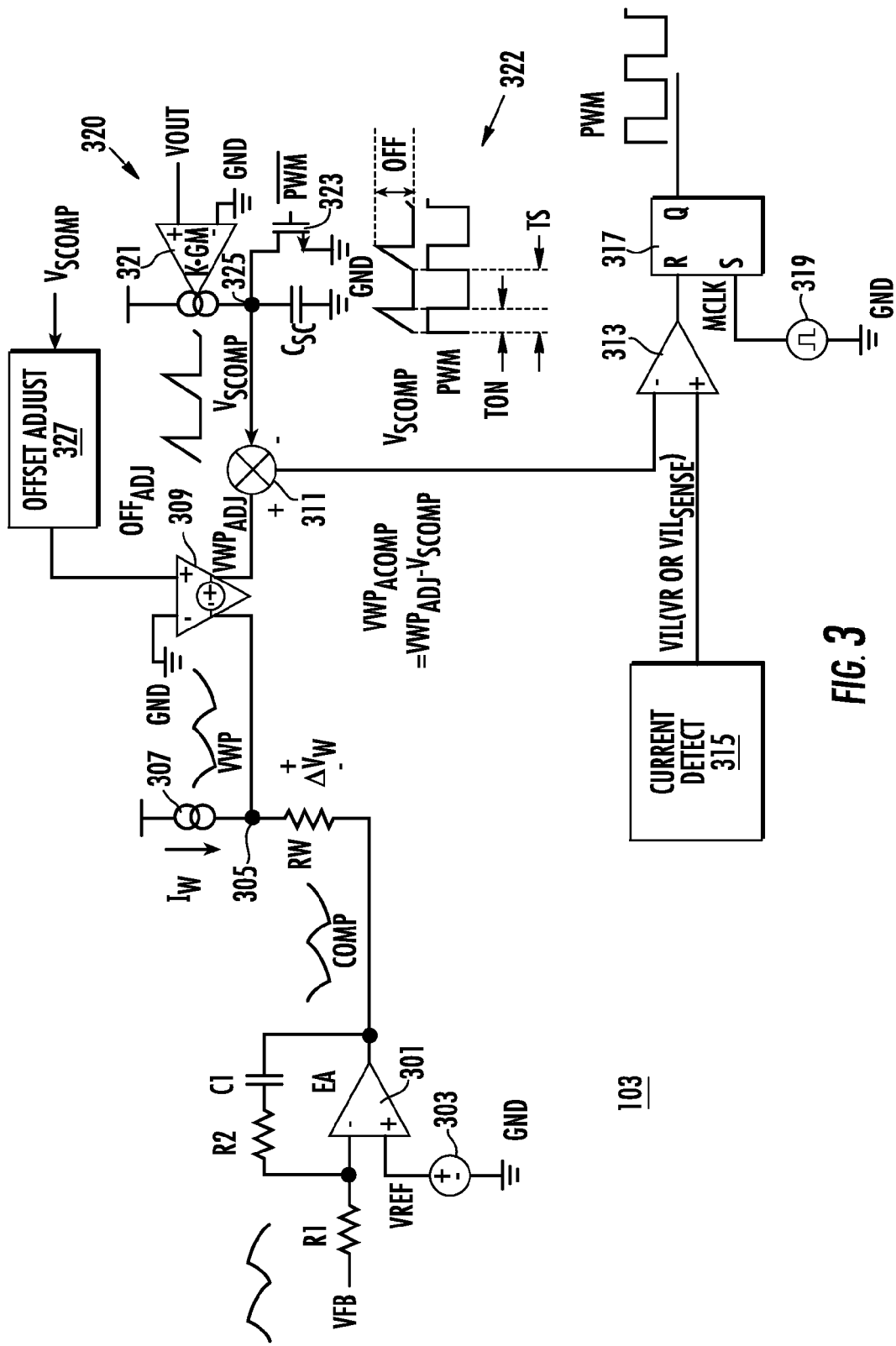
FIG. 3 is a simplified schematic and block diagram of the modulator of FIG. 1 implemented according to an exemplary embodiment.

FIG. 3 is a simplified schematic and block diagram of the modulator 103 implemented according to an exemplary embodiment. The "X" notation is dropped in FIG. 3, where it is understood that the modulator 103 may be implemented for single phase or multiphase. VFB (indicative of VOUT) is provided to a negative (or inverting, "−") input of an error amplifier (EA) 301 through a resistor R1, which receives a reference voltage VREF at its positive (or non-inverting, "+") input. VREF is provided by a voltage source 303 referenced to GND. A resistor R2 and a capacitor C1 are coupled in series between the negative input and the output of the error amplifier 301, having an output which provides a compensation voltage COMP. The error amplifier 301 is configured as an integrating amplifier (via RC circuit components) in which COMP develops a level indicative of the relative error of VOUT.

COMP is provided to one end of a window resistor RW, having its other end coupled to a window node 305 developing and window voltage VWP. A current source 307 develops a window current $I_W$ flowing into node 305, and resistor RW develops a window offset voltage $\Delta V_W$ (VWP=COMP+$\Delta V_W$). The window offset is used to develop a control window as understood by those of ordinary skill in the art. Other control window functions may be used. VWP is provided to a negative output of an offset amplifier 309, having a negative input coupled to GND, a positive input receiving an offset voltage $OFF_{ADJ}$, and a positive output developing an adjust voltage $VWP_{ADJ}$. Thus, $VWP_{ADJ}$=VWP+$OFF_{ADJ}$. $VWP_{ADJ}$ is provided to a positive input of an adder 311, which receives a slope compensation voltage $V_{SCOMP}$ at its negative input and which provides an adjusted output voltage $VWP_{ACOMP}$=$VWP_{ADJ}$−$V_{SCOMP}$. $VWP_{ACOMP}$ is provided to the negative input of a comparator 313, which has a positive input receiving a current detect signal VIL. VIL is provided by a current detect circuit 315 which senses or otherwise estimates or synthesizes output inductor current to develop VIL. The output of the comparator 313 is provided to the reset (R) input of a set-reset (SR) latch 317, having its set (S) input receiving a clock signal MCLK and its Q output providing an output PWM signal.

The current detect circuit 315 may be implemented according to any one of various methods for sensing current through the corresponding output inductor L. In one embodiment, a current sensor or the like is coupled to or placed in series with the (or each) output inductor L for sensing actual inductor current and providing VIL as a sensed current voltage $VIL_{SENSE}$. For example, a sense resistor (not shown) may be coupled in series with L and a sense circuit or the like is provided to detect the voltage across the sense resistor. In another embodiment, a current sensing transformer may be used, or the output inductor L may be an inductive coil of a transformer with a current sense coil. In another embodiment, a low-pass RC network or the like may be coupled across the inductor L to filter voltage across the inductor and sense current through the equivalent series resistance (ESR) of the inductor L.

In yet another embodiment of the current detect circuit 315, the current through the inductor may be synthetically developed or generated, such as described in U.S. Pat. No. 6,791,306 entitled "Synthetic Ripple Regulator" or U.S. Pat. No. 6,922,044 entitled "Synchronization Of Multiphase Synthetic Ripple Voltage Regulator" in which both patents are incorporated herein by reference. In either of these cases, an auxiliary ripple waveform, shown as VR in FIG. 3, is generated that effectively replicates ripple current through the output inductor LX. As an example, the output voltage VOUT is multiplied by a transconductance gain GM (e.g., VOUT·GM) to develop a first current proportional to VOUT used to continuously discharge a ripple capacitor coupled to a ripple node. This is based on the fact that one end of the output inductor LX is continuously coupled to VOUT. Similarly, the input voltage VIN is multiplied by a transconductance gain GM (e.g., VIN·GM) to develop a current used to charge the ripple capacitor when PWM is turned on or pulled high. When PWM is low, this charge current based on VIN is removed. This is based on the fact that the other end of the output inductor LX is switched between VIN and GND by the electronic switches Q1X and Q2X based on the PWM signal. The ripple voltage developed across the ripple capacitor replicates ripple current through the inductor.

MCLK is shown generated by a clock source 319 which may be an oscillator in one embodiment (e.g., for a single phase application) or which may be a master clock generator in another embodiment (e.g., for a multiphase application). The slope compensation voltage $V_{SCOMP}$ is generated by a slope compensation circuit 320. The slope compensation circuit 320 includes a transconductance amplifier 321, a transistor 323 and a slope compensation capacitor $C_{SC}$. The transconductance amplifier 321 receives VOUT at its positive input and GND at its negative input and outputs a current proportional to VOUT to a slope compensation node 325 developing $V_{SCOMP}$. The proportionality is based on the transconductance gain GM of the transconductance amplifier 321 multiplied by a gain factor K (or K·GM). The capacitor $C_{SC}$ is coupled between node 325 and GND. The transistor 323 is illustrated as an N-type field-effect transistor (FET) or the like having its drain coupled to node 325, its source coupled to GND and its gate receiving $\overline{PWM}$, in which an overstrike or bar over a signal name denotes a logically inverted version of the signal.

In operation of the slope compensation circuit 320, when PWM is low, $\overline{PWM}$ goes high turning on transistor 323, grounding the capacitor $C_{SC}$ so that $V_{SCOMP}$ goes low to GND. When PWM goes high, the transconductance amplifier 321 charges the capacitor $C_{SC}$ so that $V_{SCOMP}$ ramps up while PWM is high. A graphic depiction 322 is shown illustrating PWM with a period TS and on time TON (while PWM is high during period TS) in which $V_{SCOMP}$ ramps up during the on time of PWM and then discharges to GND for the remainder of the cycle during each clock cycle. The adder 311 subtracts the ramping $V_{SCOMP}$ voltage from $VWP_{ADJ}$ as previously described for providing $VWP_{ACOMP}$.

An offset adjust circuit 327 measures or otherwise predicts a DC offset voltage OFF generated by $V_{SCOMP}$ (as shown in the graphic depiction 322) and provides $OFF_{ADJ}$ to the offset amplifier 309. The offset amplifier 309 adjusts VWP based on $OFF_{ADJ}$ to develop $VWP_{ADJ}$ provided to the adder 311. In one embodiment, the offset amplifier 309 adds $OFF_{ADJ}$ to VWP to develop $VWP_{ADJ}$, or $VWP_{ADJ}=VWP+OFF_{ADJ}$. Thus, $VWP_{ACOMP}=VWP+OFF_{ADJ}-V_{SCOMP}$. As described further herein, $VWP_{ACOMP}$ is an adjusted version of VWP for both slope compensation and the additional DC offset shift caused by slope compensation, so that the DC bias point is re-shifted back its desired target level for balanced slope compensation.

Figure 4:
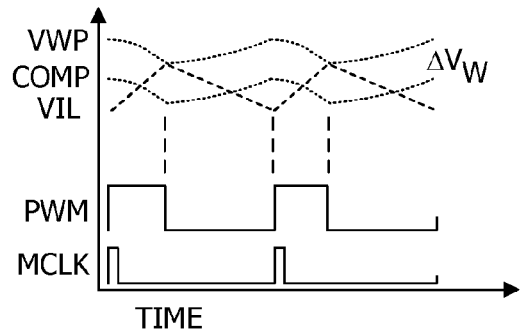
FIG. 4 is a timing diagram plotting VWP, COMP, VIL, PWM and MCLK versus TIME for a "balanced" topology without slope compensation and without offset voltage correction.

FIG. 4 is a timing diagram plotting VWP, COMP, VIL, PWM and MCLK versus TIME for a "balanced" topology without slope compensation and without offset voltage correction. In this case, operation is illustrated for when $V_{SCOMP}$ and $OFF_{ADJ}$ are zero or otherwise ignored so that VWP is provided substantially unmodified to the negative input of the comparator 313. VWP and COMP are illustrated as arbitrary periodic waveforms depicted with dashed lines for purposes of illustration. They are shown differentiated by the window offset voltage $\Delta V_W$ with VWP at the upper end and COMP at the lower end of the window voltage range. VWP, COMP and VIL are plotted together to illustrate operation of the comparator 313 and the SR latch 317 for generating the PWM signal based on pulses of MCLK.

In operation of the regulator 102 using the regulator 103 as depicted in FIG. 4 for the balanced topology without slope compensation and without offset voltage correction, each pulse of MCLK sets the SR latch 317 to assert PWM high. When PWM is asserted high, the corresponding upper switch Q1 is turned on while the lower switch Q2 is turned off so that current flows from VIN through Q1 and the output inductor L. The current through the inductor L, as indicated by VIL, rises while PWM is high. When VIL reaches VWP, the comparator 313 switches pulling its output high to reset the SR latch 317 thereby pulling PWM back low. When PWM goes low, the upper switch Q1 is turned off and the lower switch Q2 is turned on so that current in the output inductor L ramps low as indicated by VIL. Operation repeats in this manner during consecutive cycles of MCLK. In the configuration illustrated, it is appreciated that $V_{SCOMP}$ and $OFF_{ADJ}$ are not zero when there are PWM pulses since $V_{SCOMP}$ is dependent thereon as depicted by the slope compensation circuit 320. FIG. 4 is provided for purposes of comparison.

Figure 5:
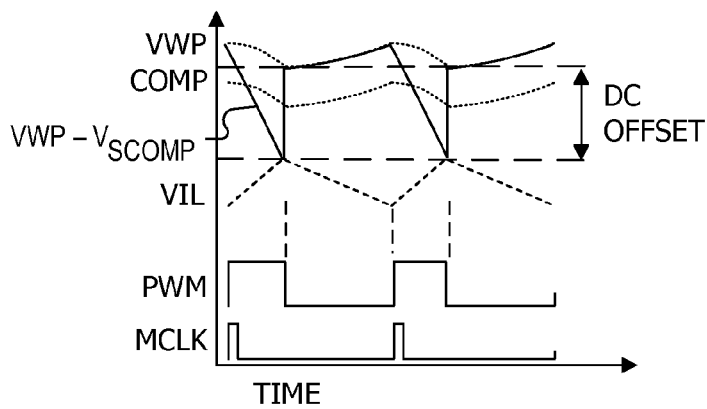
FIG. 5 is a timing diagram illustrating operation of the regulator using the modulator of FIG. 1 substantially similar to FIG. 4 except that slope compensation is introduced in which $V_{SCOMP}$ is not zero whereas $OFF_{ADJ}$ is zero or otherwise ignored.

FIG. 5 is a timing diagram illustrating operation of the regulator 102 using the modulator 103 substantially similar to FIG. 4 except that slope compensation is introduced in which $V_{SCOMP}$ is not zero whereas $OFF_{ADJ}$ is zero or otherwise ignored. FIG. 5 illustrates the unbalanced slope compensation configuration of the modulator 103 according to conventional configurations in which the DC offset correction provided by the offset adjust circuit 327 and the offset amplifier 309 was not provided (so that $OFF_{ADJ}$ was not available to make the desired DC offset correction). In this case, $V_{SCOMP}$ is subtracted from VWP ($VWP-V_{SCOMP}$) and the result is provided to the negative input of the comparator 313.

Operation for the conventional case in which $V_{SCOMP}$ is not zero and $OFF_{ADJ}$ is zero is similar to that shown in FIG. 4 except that $V_{SCOMP}$ introduces negative excursions on the VWP signal pushing VIL lower by an amount shown as DC OFFSET. It is noted that the control loop pushes COMP up or down in an attempt to compensate for the DC offset, which unbalances its natural and desired steady-state operating condition. This results in undesirable unbalanced operation which is not advantageous for reasons previously described herein.

Figure 6:
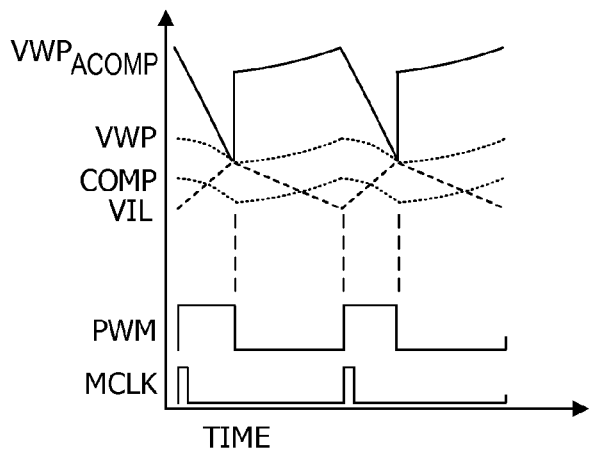
FIG. 6 is a timing diagram illustrating operation of the regulator using the modulator of FIG. 1 substantially similar to FIGS. 4 and 5 except that $V_{SCOMP}$ and $OFF_{ADJ}$ are not zero and operate with balanced slope compensation according to the present invention.

FIG. 6 is a timing diagram illustrating operation of the regulator 102 using the modulator 103 substantially similar to FIGS. 4 and 5 except that $V_{SCOMP}$ and $OFF_{ADJ}$ are not zero and operate with balanced slope compensation according to the present invention. In this case, $VWP_{ACOMP}$, which is provided to the negative input of the comparator 313, is plotted along with VWP, COMP and VIL. As previously described, $VWP_{ACOMP}=VWP+OFF_{ADJ}-V_{SCOMP}$, in which $VWP_{ACOMP}$ has a similar waveform shape as $VWP-V_{SCOMP}$ shown in FIG. 5 except adjusted by $OFF_{ADJ}$ which compensates for the DC OFFSET.

Operation of the modulator 103 with slope compensation provided by the slope compensation circuit 320 and DC offset adjustment provided by the offset adjust circuit 327 and the offset amplifier 309 as shown in FIG. 6 shows that VIL relative to VWP and COMP operates substantially the same as the balanced configuration shown in FIG. 4. In FIG. 4, however, slope compensation is not provided. FIG. 6 is a balanced slope compensation configuration according to the present invention in which the benefits of slope compensation and a balanced configuration are achieved.

In one embodiment, the offset adjust circuit 327 operates as a translinear block which determines the peak-to-peak level of $V_{SCOMP}$ shown as the DC offset OFF and generates $OFF_{ADJ}$ at the appropriate level to achieve the results shown in FIG. 6. In one embodiment, the offset adjust circuit 327 generates $OFF_{ADJ}$ according to the following equation (1):

$$OFF_{ADJ} = \frac{K \cdot GM \cdot VOUT^2}{C_{SC} \cdot VIN \cdot FSW} \tag{1}$$

where K·GM is the transconductance gain factor of the amplifier 321, $C_{SC}$ is the capacitance of the capacitor $C_{SC}$, and FSW is the switching frequency of the modulator 103 as determined by the frequency of MCLK. It is noted that $OFF_{ADJ}$ may be estimated or otherwise determined based on VOUT, VIN and FSW.

A modulator with balanced slope compensation according to one embodiment includes a control network, a slope compensation network, an offset network and an adjust network. The control network receives a feedback signal indicative of an output voltage and provides the loop control signal. The slope compensation network develops a slope compensation signal. The offset network determines a DC offset of the slope compensation signal. The adjust network combines the DC offset, the slope compensation signal and the loop control signal to provide a balanced slope compensated control signal. The DC offset may be determined as a peak of the slope compensation signal. The slope compensation signal may be developed based on the output voltage and a pulse control signal, in which the pulse control signal is developed using the balanced slope compensated control signal.

A method of providing balanced slope compensation for a switch mode regulator according to one embodiment includes receiving a feedback signal indicative of an output voltage and providing a loop control signal, determining a DC offset of the slope compensation signal, and combining the DC offset, the slope compensation signal and the loop control signal to provide a balanced slope compensated control signal. The method may include determining a peak level of the slope compensation signal. The method may include using the balanced slope compensated control signal to develop a pulse control signal, and using an output voltage and the pulse control signal to generate the slope compensation signal. The method may include adding the DC offset, the loop control signal and the slope compensation signal together to provide the balanced slope compensated control signal.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A modulator with balanced slope compensation that develops a pulse width modulation control signal, comprising:
   a control network which receives a feedback signal indicative of an output voltage and which provides a loop control signal;
   a slope compensation network which develops a slope compensation signal, wherein said slope compensation network resets said slope compensation signal while the pulse width modulation control signal is in a first state, and said slope compensation network ramps said slope compensation signal while the pulse width modulation control is in a second state;
   an offset network which determines a DC offset of said slope compensation signal; and
   an adjust network which combines said DC offset, said slope compensation signal and said loop control signal to provide a balanced slope compensated control signal.

2. The modulator of claim 1, wherein said offset network determines a peak level of said slope compensation signal to determine said DC offset.

3. The modulator of claim 1, wherein said control network comprises an error amplifier developing a compensation signal and a window control network which adds a window offset signal to said compensation signal for developing said loop control signal.

4. The modulator of claim 1, wherein said slope compensation network develops said slope compensation signal based on said output voltage and the pulse width modulation control signal which is developed using said balanced slope compensated control signal.

5. The modulator of claim 1, further comprising:
   a current detector which provides a current sense signal indicative of an output inductor current;
   a comparator which compares said balanced slope compensated control signal with said current sense signal for providing a reset signal;
   a clock generator providing a clock signal; and
   a logic network which develops the pulse width modulation control signal based on said clock signal and said reset signal.

6. The modulator of claim 5, wherein said slope compensation network comprises:
   a slope compensation capacitor coupled between a slope compensation node and a reference node;
   a current source which provides a current based on said output voltage to said slope compensation node; and
   a switch coupled to said slope compensation node and responsive to the pulse width modulation control signal for selectively discharging said slope compensation capacitor.

7. The modulator of claim 1, wherein said adjust network comprises:
   a first adder which adds said DC offset to said loop control signal to provide an adjusted control signal; and
   a second adder which adds said slope compensation signal to said adjusted control signal to provide said balanced slope compensated control signal.

8. An electronic device, comprising:
   a switching circuit responsive to a pulse width modulation control signal for switching voltage applied to an output inductor to convert an input voltage to a regulated output voltage; and
   a modulator, comprising:
      a control network receiving a feedback sense signal indicative of said output voltage and receiving a reference signal for developing a loop control voltage;
      a slope compensation network which develops a slope compensation voltage, wherein said slope compensation network resets said slope compensation voltage while said pulse width modulation control signal is in a first state, and wherein said slope compensation network ramps said slope compensation voltage while the pulse width modulation control is in a second state;
      an offset network which determines a DC offset voltage from said slope compensation voltage;
      an adjust network which combines said DC offset voltage, said slope compensation voltage and said loop control voltage to provide a balanced slope compensated control voltage;
      a current detector which provides a current sense voltage indicative of current through said output inductor; and
      a comparator network which develops said pulse width modulation control signal using said balanced slope compensated control voltage and said current sense voltage.

9. The electronic device of claim 8, wherein said switching circuit is configured as a buck regulator circuit comprising:
   a first power switch coupled between an input node and a phase node;
   a second power switch coupled between said phase node and a reference node;
   wherein said output inductor is coupled between said phase node and an output node developing said output voltage; and
   an output capacitor coupled between said output node and said reference node.

10. The electronic device of claim 8, further comprising a processor and a memory both receiving power via said output voltage.

11. The electronic device of claim 8, wherein said offset network determines a peak level of said slope compensation voltage to determine said DC offset voltage.

12. The electronic device of claim 8, wherein said control network comprises an error amplifier which develops a compensation voltage and a window control network which adds a window offset voltage to said compensation voltage for developing said loop control voltage.

13. The electronic device of claim 8, wherein said slope compensation network develops said slope compensation voltage based on said output voltage and said pulse width modulation control signal.

14. The electronic device of claim 13, wherein said slope compensation network comprises:
   a slope compensation capacitor coupled between a slope compensation node and a reference node;
   a current source which provides a slope compensation current based on voltage level of said output voltage to said slope compensation node to charge said slope compensation capacitor; and
   a switch coupled to said slope compensation node for selectively discharging said slope compensation capacitor using said pulse width modulation control signal.

15. The electronic device of claim 8, wherein said adjust network comprises:
   a first adder which adds said DC offset voltage to said loop control voltage to provide an adjusted control voltage; and
   a second adder which adds said slope compensation voltage to said adjusted control voltage to provide said balanced slope compensated control voltage.

16. The electronic device of claim 8, wherein said comparator network comprises:
   a comparator which compares said balanced slope compensated control voltage with said current sense voltage for providing a reset signal;
   a clock generator providing a clock signal; and
   a logic network which develops said pulse width modulation control signal based on said clock signal and said reset signal.

17. A method of providing balanced slope compensation for a switch mode regulator that develops a pulse width modulation control signal, comprising:
   receiving a feedback signal indicative of an output voltage and providing a loop control signal;
   developing a slope compensation signal that is reset while the pulse width modulation control signal is in a first state, and that ramps while the pulse width modulation control is in a second state;
   determining a DC offset of the slope compensation signal; and
   combining the DC offset, the slope compensation signal and the loop control signal to provide a balanced slope compensated control signal.

18. The method of claim 17, wherein said determining a DC offset comprises determining a peak level of the slope compensation signal.

19. The method of claim 17, wherein said determining a DC offset comprises determining the DC offset based on an input voltage, an output voltage and a switching frequency.

20. The method of claim 17, wherein said developing a slope compensation signal comprises:
   using the balanced slope compensated control signal to develop the pulse width modulation control signal; and
   using an output voltage and the pulse width modulation control signal to generate the slope compensation signal.

21. The method of claim 17, wherein said combining comprises adding the DC offset, the loop control signal and the slope compensation signal together to provide the balanced slope compensated control signal.

* * * * *